US012735173B2

(12) United States Patent
Block

(10) Patent No.: US 12,735,173 B2
(45) Date of Patent: Sep. 15, 2026

(54) APPARATUSES AND METHODS FOR FLIGHT CONTROL SURFACES

(71) Applicant: The Boeing Company, Arlington, VA (US)

(72) Inventor: Samuel L. Block, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/795,051

(22) Filed: Aug. 5, 2024

(65) Prior Publication Data

US 2026/0035067 A1 Feb. 5, 2026

(51) Int. Cl.
*B64C 13/28* (2006.01)

(52) U.S. Cl.
CPC .................................... *B64C 13/28* (2013.01)

(58) Field of Classification Search
CPC ................ B64C 9/02; B64C 9/16; B64C 9/18
See application file for complete search history.

(56) References Cited

U.S. PATENT DOCUMENTS 2,959,066 A 11/1960 Bailey et al.
4,498,647 A * 2/1985 Boehringer ............... B64C 9/02 244/99.3
4,995,575 A 2/1991 Stephenson
5,050,822 A * 9/1991 Whitehouse .............. B64C 9/16 244/1 N
5,163,534 A 11/1992 Hillman
6,530,544 B2 * 3/2003 Milliere .................. B64C 13/24 403/150

(Continued)

FOREIGN PATENT DOCUMENTS

CA 3033754 A1 9/2019
DE 4009549 A1 3/1991

(Continued)

OTHER PUBLICATIONS

Printout of Thomson Linear Slides product information on linear slides, downloaded from ThomsonLinear.com website on Aug. 18, 2017.

(Continued)

*Primary Examiner* — Brian M O'Hara

(74) *Attorney, Agent, or Firm* — Kolitch Romano Dascenzo Gates LLP

(57) ABSTRACT

An aircraft apparatus comprises a flight control surface, an actuation assembly, a link, and an arm. The actuation assembly transitions the flight control surface between a stowed configuration and a deployed configuration. The link is pivotably coupled to a support and comprises a stop surface. The arm is connected to the flight control surface and is pivotally coupled to the link. The arm comprises a contact surface arranged to engage the stop surface to limit pivotal movement of the arm relative to the link and thus define the deployed configuration of the flight control surface.

A method comprises translating an arm and a flight control surface in a first direction towards a deployed configuration while simultaneously rotating a link. The method further comprises bringing the arm and the stop surface of link into contact to stop translation of the arm at the deployed configuration of the flight control surface.

20 Claims, 9 Drawing Sheets

(56) References Cited

U.S. PATENT DOCUMENTS 6,923,405 B2 * 8/2005 Cline .................... B64C 13/341
244/99.4
7,190,096 B2 3/2007 Blanding et al.
7,834,494 B2 11/2010 Blanding et al.
7,883,059 B2 2/2011 Kunz
8,033,500 B1 10/2011 Charafeddine et al.
8,104,721 B2 1/2012 Pohl
8,191,824 B2 6/2012 Shaheen et al.
8,511,608 B1 * 8/2013 Good ........................ B64C 9/16
244/99.3
9,248,905 B2 * 2/2016 Gerard .................. B64C 23/005
9,586,675 B2 * 3/2017 Ungar ....................... B64C 9/00
9,963,220 B2 5/2018 Ishihara et al.
10,234,012 B1 3/2019 Latif
10,443,696 B1 10/2019 Latif et al.
10,611,462 B2 4/2020 Young
11,148,821 B2 * 10/2021 Konicek .............. B64D 41/007
11,338,907 B2 5/2022 Young
11,840,353 B2 * 12/2023 Rewerts ............... B64D 41/007
2009/0146014 A1 6/2009 Gyuricsko et al.
2011/0042525 A1 2/2011 Parker
2012/0012696 A1 1/2012 Sakurai et al.
2017/0174343 A1 6/2017 Brakes
2018/0194454 A1 7/2018 Olson et al.
2019/0055002 A1 2/2019 Bekircan
2019/0101197 A1 4/2019 Gavriliuc

FOREIGN PATENT DOCUMENTS

EP 2433863 A2 3/2012
JP H08211173 A 8/1996
WO WO2018197265 A1 11/2018

OTHER PUBLICATIONS

Hagen et al., "The X-38 V-201 Flap Actuator Mechanism," Proceedings of the 37th Aerospace Mechanisms Symposium, Johnson Space Center, May 19-21, 2004.
Installation guide for HepcoMotion precision ring and track systems, 2015.

* cited by examiner

APPARATUSES AND METHODS FOR FLIGHT CONTROL SURFACES

GOVERNMENT RIGHTS

This invention was made with government support under contract number 80AFRC22N0008 awarded by the National Aeronautics and Space Administration. The government has certain rights in the invention.

FIELD

The present disclosure relates to apparatuses and methods for flight control surfaces and translating flight control surfaces.

BACKGROUND

Flight control surfaces are moved between two or more positions to affect the aerodynamics of an aircraft. Aircraft comprise systems and apparatuses for moving flight control surfaces and guiding the flight control surfaces during movement. Systems and apparatuses are used to guide flight control surfaces during movement to prevent errors in alignment of the flight control surfaces. Examples of errors in alignment include a surface moving beyond a target position or one side of a surface becoming misaligned with another side of the surface.

SUMMARY

Aircraft apparatuses, aircraft comprising aircraft apparatuses, and methods for aircraft apparatuses are disclosed. In one example, an aircraft apparatus comprises: a flight control surface, an actuation assembly, a link, and an arm. The actuation assembly is operatively coupled to the flight control surface and configured to operatively transition the flight control surface between at least a stowed configuration and a deployed configuration.

The link comprises a first end region and a second end region opposite the first end region. The link has a first end region pivot axis arranged at a support and a second end region pivot axis. The link also comprises a stop surface.

The arm is operatively connected to the flight control surface and pivotally coupled to the second end region of the link about the second end region pivot axis. The arm comprises a contact surface that is arranged and configured to engage the stop surface to limit pivotal movement of the arm relative to the link and thus define the deployed configuration of the flight control surface.

In some examples, an aircraft comprises an aircraft apparatus and a wing.

In further examples, a method of operating an aircraft apparatus comprises translating an arm and a flight control surface in a first direction to a deployed configuration while simultaneously rotating a link. The exemplary method further comprises bringing the arm and a stop surface of the link into contact to stop translation of the arm at the deployed configuration of the flight control surface.

DESCRIPTION

Aircraft apparatuses and methods for aircraft apparatuses are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 2:
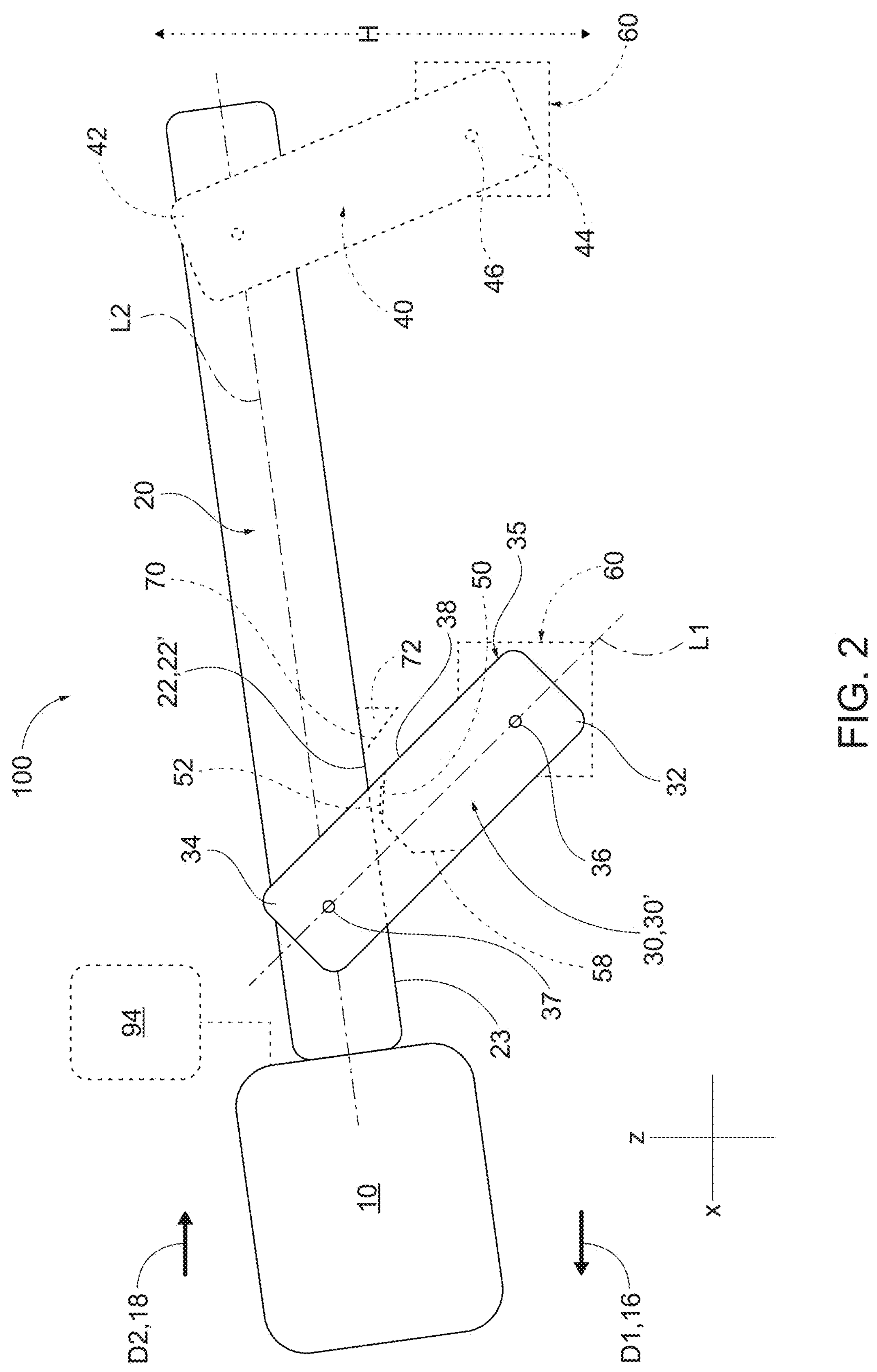
FIG. 2 is schematic diagram representing an aircraft apparatus.

FIG. 2 is a schematic illustration of aircraft apparatus 100, and FIGS. 3-8 illustrate non-exclusive examples of aircraft apparatus 100. Where appropriate, the reference numerals from the schematic illustration of FIG. 2 are used to designate corresponding parts of the examples of FIGS. 3-8; however, the examples of FIGS. 3-8 are non-exclusive and do not limit aircraft apparatus 100 to the illustrated embodiments of FIGS. 3-8. That is, aircraft apparatus 100 is not limited to the specific embodiments of FIGS. 3-8, and aircraft apparatus 100 may incorporate any number of the various aspects, configurations, characteristics, properties, etc. of aircraft apparatus 100 that are illustrated in and discussed with reference to the schematic representations of FIG. 2 and/or the embodiments of FIGS. 3-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 3-8; however, it is within the scope of the present disclosure that the previously discussed features, variants, etc. may be utilized with the examples of FIGS. 3-8.

Figure 1:
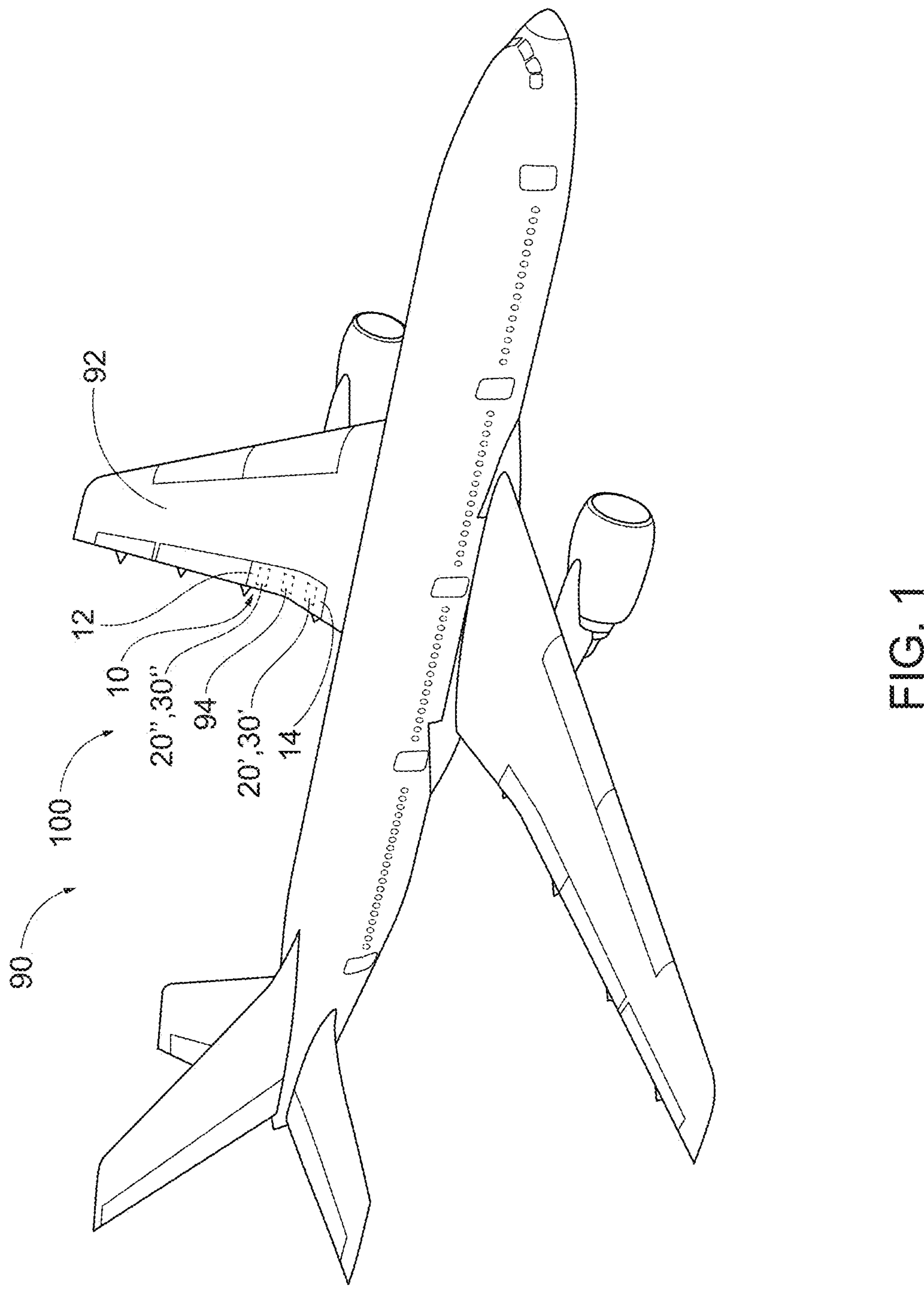
FIG. 1 is a perspective view of an aircraft.

FIG. 1 depicts an exemplary aircraft 90 comprising an aircraft apparatus 100 and a wing 92. Aircraft apparatus 100 comprises a flight control surface 10 arranged on wing 92. Flight control surfaces are moved between positions to affect aerodynamic characteristics of wings.

Actuation assemblies move flight control surfaces between positions. In the example of FIG. 1, an actuation assembly 94 applies force to flight control surface 10, and links 30', 30" and arms 20', 20" guide movement of flight control surface 10.

FIG. 1 further depicts an exemplary arrangement where arm 20' and link 30' are operatively coupled to a first side 12 of flight control surface 10, arm 20" and link 30" are operatively coupled to a second side 14 of flight control surface 10, and actuation assembly 94 is arranged between first side 12 and second side 14. In the example, first side 12 is a side distal from a fuselage of aircraft 90 and second side 14 is a side proximal to the fuselage. FIG. 1 also depicts actuation assembly 94 arranged between arm 20' and arm 20".

As schematically illustrated in FIG. 2, an aircraft apparatus 100 comprises a flight control surface 10, an actuation assembly 94, a link 30, and an arm 20. Actuation assembly 94 is operatively coupled to flight control surface 10 and configured to operatively transition flight control surface 10 between at least a stowed configuration 18 and a deployed configuration 16.

Link 30 comprises a first end region 32 and a second end region 34 opposite first end region 32. Link 30 has a first end region pivot axis 36 arranged at a support 60 and a second end region pivot axis 37. Link 30 also comprises a stop surface 50.

Arm 20 is operatively connected to flight control surface 10 and pivotally coupled to second end region 34 of link 30 about second end region pivot axis 37. Arm 20 comprises a contact surface 22 that is arranged to engage stop surface 50 to limit pivotal movement of arm 20 relative to link 30 and thus define deployed configuration 16 of flight control surface 10. Contact surface 22 may also be referred to herein as first contact surface 22 for clarity when referring to multiple contact surfaces.

Arm 20 and actuation assembly 94 are operatively coupled to flight control surface 10. Arm 20 further is coupled to link 30 at second end region pivot axis 37. Link 30 further is coupled to first end region pivot axis 36 arranged at support 60. When actuation assembly 94 transitions flight control surface 10 between stowed configuration 18 and deployed configuration 16, arm 20 moves with flight control surface 10 and pivots relative to link 30 while link 30 simultaneously pivots relative to support 60. In this manner, arm 20 and link 30 influence and guide flight control surface 10 as flight control surface 10 transitions between stowed configuration 18 and deployed configuration 16. FIG. 2 depicts the coupling of flight control surface 10, link 30, arm 20, and actuation assembly 94 as well as a first direction D1 towards deployed configuration 16 and a second direction D2 towards stowed configuration 18.

During movement of arm 20, stop surface 50 contacts arm 20 and prevents further movement of arm 20 in first direction D1 towards deployed configuration 16. In other words, stop surface 50 limits movement of arm 20. Stop surface 50 may also be referred to herein as deployment stop surface 50 and first direction stop surface 50. Furthermore, flight control surface 10 is connected to arm 20, and therefore, flight control surface 10 cannot move in first direction D1 when stop surface 50 is in contact with arm 20. Thus, the deployed configuration 16 of flight control surface 10 is defined by contact between stop surface 50 and arm 20.

Figure 4:
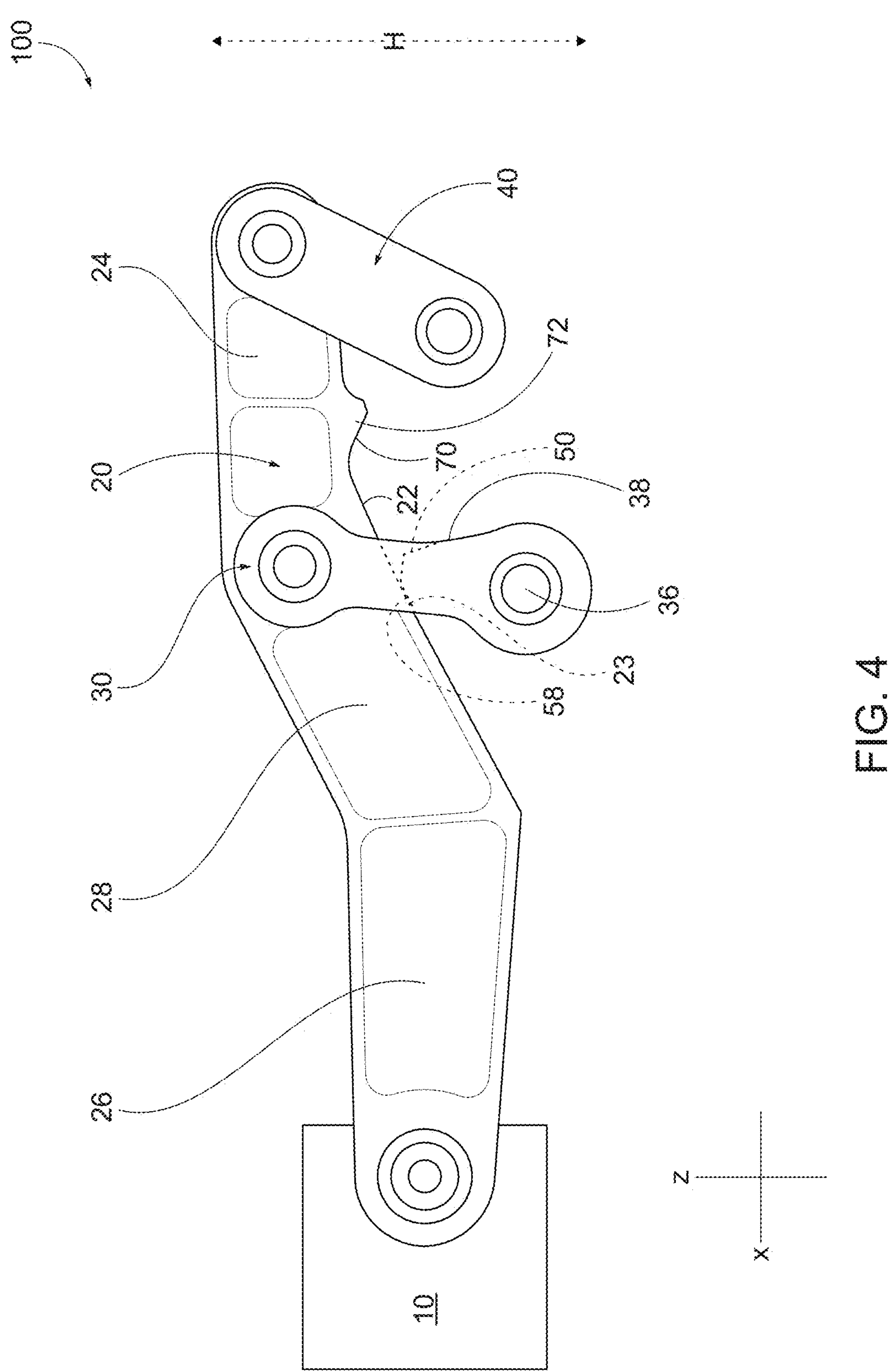
FIG. 4 is a front perspective view of an arm and a link in a first position.
Figure 5:
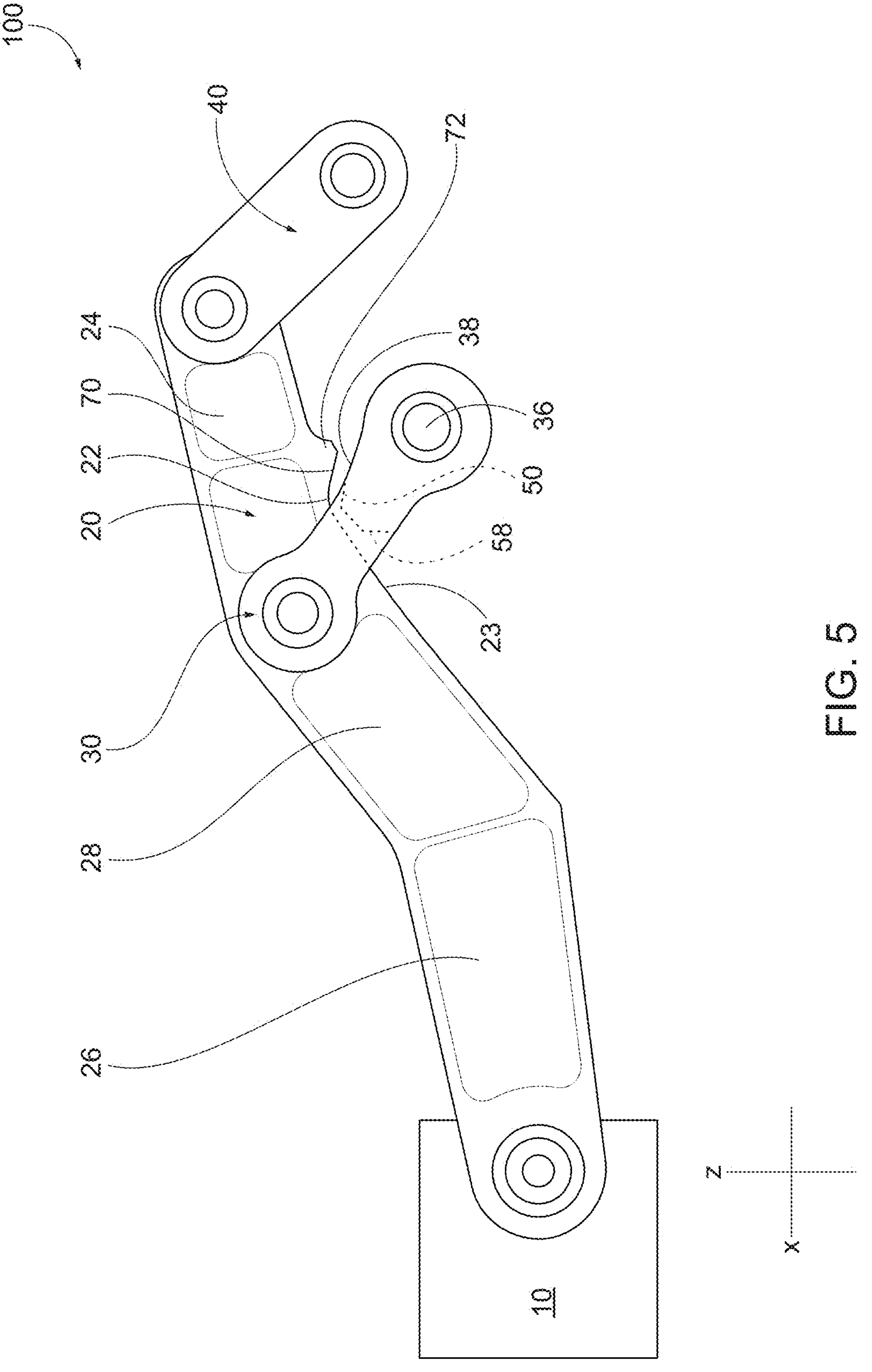
FIG. 5 is a front perspective view of the arm and the link in a second position.
Figure 6:
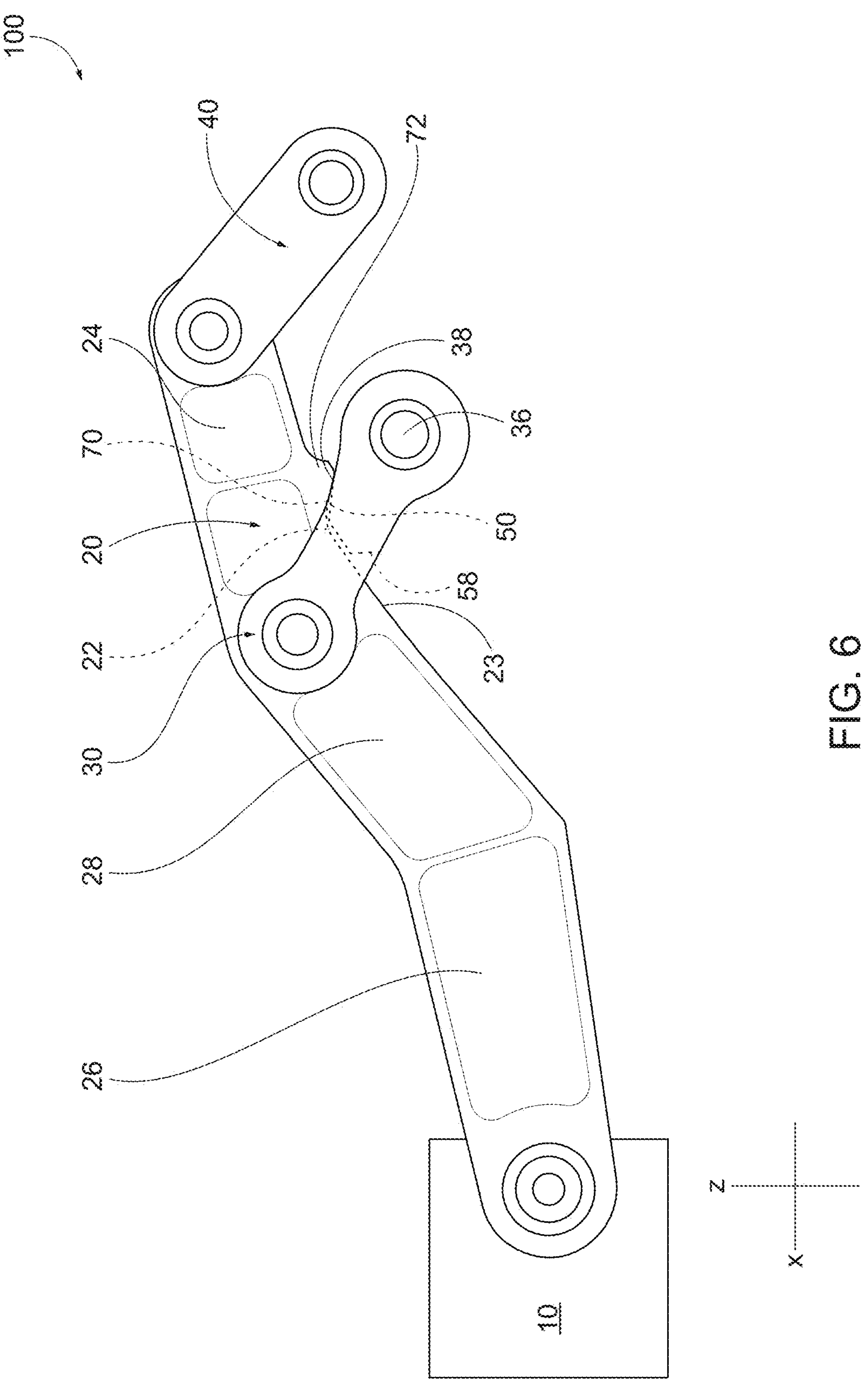
FIG. 6 is a front perspective view of the arm and the link in a third position.

FIGS. 4-6 depict an exemplary transition of an arm 20 and a link 30 from a first configuration (such as a stowed configuration 18) to a deployed configuration 16. FIG. 4 depicts arm 20 and link 30 in a first configuration. FIG. 5 depicts arm 20 and link 30 in a second configuration that is transitioned toward the deployed configuration 16 from the first configuration. FIG. 6 depicts arm 20 and link 30 in deployed configuration 16.

Examples of actuation assembly 94 comprise linear and/or rotary actuators. Examples of actuation assembly 94 comprise hydraulic, pneumatic, electric, magnetic, and mechanical actuators, Examples of actuation assembly 94 include magnetic rotary actuators and linear hydraulic actuators with a return spring. Examples of actuation assembly 94 further comprise an actuation controller and/or receiving external commands for actuation. Examples of actuation assembly 94 include one or more actuators positioned along wing 92. The example of FIG. 1 depicts actuation assembly 94 positioned between arms 20', 20" but other examples may be positioned outside of arms 20', 20".

Arm 20 operatively couples flight control surface 10 and link 30, as depicted in FIG. 2. Thus, arm 20, in conjunction with link 30, influences and guides movement of flight control surface 10.

Examples of arm 20 vary in shape and configuration. Examples of arm 20 comprise multiple portions. In the example of FIG. 4, a first arm portion 24 extends from a connection with second end region 34 of link 30 in the second direction D2 towards stowed configuration 18. The example of FIG. 4 further comprises a second arm portion 26 extending away from link 30 toward flight control surface 10, and a connecting portion 28 connects first arm portion 24 and second arm portion 26. In examples where arm 20 has multiple portions, the arm longitudinal axis L2 is defined as the longitudinal axis of the portion of arm 20 that extends from a connection with second end region 34 of link 30 in the second direction D2 toward the stowed configuration, or the first arm portion 24.

In examples comprising a second link 40, arm 20 operatively couples second link 40 with link 30 (which also may be referred to as a first link 30) and flight control surface 10, as depicted in FIG. 2. FIG. 4 depicts an example comprising a link 30 and a second link 40. In the example of FIG. 4, a first arm portion 24 extends between second end region 34 of link 30 and second link 40.

In the example of FIG. 4, the shape of arm 20 reduces a height of a portion of aircraft apparatus 100. More specifically, connecting portion 28 of arm 20 extends in a direction of first end region pivot axis 36 such that a height H of aircraft apparatus 100 is reduced. Reduction of the height of aircraft apparatus 100 may be beneficial to reduce space within the wing consumed by aircraft apparatus 100. Reduction of the space consumed by aircraft apparatus 100 may reduce interference with space of other components and structures. Reduction of the space consumed may also allow for use of aircraft apparatus 100 in thin wing aircraft.

Link 30 is operatively coupled to arm 20 and comprises first end region pivot axis 36 and second end region pivot axis 37. In one example, second end region pivot axis 37 is coupled to arm 20 and first end region pivot axis 36 arranged at support 60. Thus, link 30 rotates relative to support 60, and arm 20 rotates relative to link 30. In one example, arm 20 rotates relative to link 30 as arm 20 translates in a first direction D1 towards the deployed configuration 16. Arm 20 is connected to flight control surface 10, and therefore, link 30 and arm 20 influence and guide movement of flight control surface 10.

Figure 3:
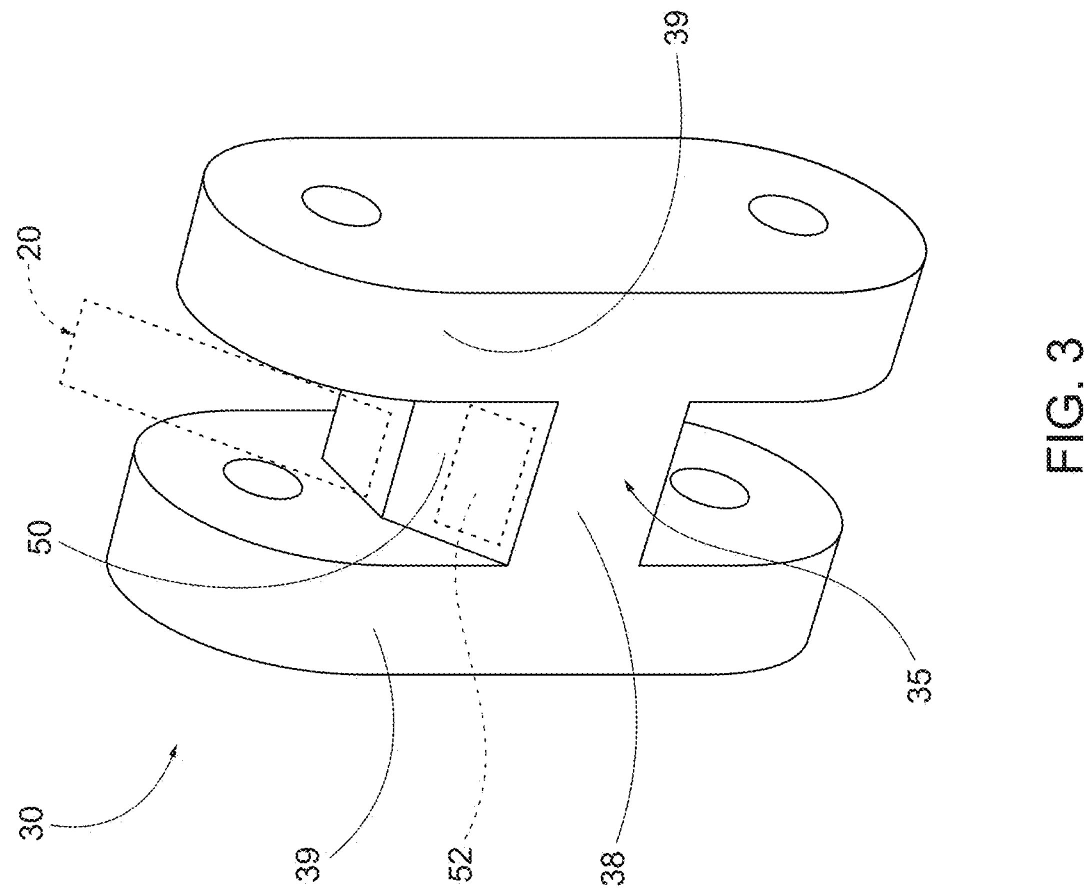
FIG. 3 is a perspective view of a link.

Examples of link 30 vary in shape and configuration. In the example of FIG. 3, link 30 comprises two limbs 39. In other examples, link 30 comprises a single limb 39. The one or more limbs 39 extend along link longitudinal axis L1.

In further examples, the one or more limbs 39 are separated by a space. The example of FIG. 3 depicts arm 20 and stop surface 50 arranged in the space between the two limbs 39. In other examples, link 30 comprises one limb 39, and stop surface 50 and arm 20 are arranged on a side of the one limb 39.

Aircraft apparatus 100 may also comprise multiple links. The example of FIG. 2 depicts aircraft apparatus 100 comprising link 30 and second link 40. Second link 40 comprises a first end region 42 connected to arm 20 and a second end region 44 pivotably coupled to a second end region pivot axis 46 arranged at support 60.

Examples of link 30 and second link 40 are connected to support 60. Examples of support 60 are part of the structure of a wing 92 or are connected to the structure of a wing 92. For example, support 60 may be a spar of a wing or be connected to a spar of a wing. Therefore, support 60 provides an anchor point connected to the structure of wing 92 for the flight control surface 10, arm 20, and link 30 to move relative to.

When stop surface 50 contacts arm 20, arm 20 cannot continue to move in first direction D1, thereby limiting pivotal movement of arm 20 relative to link 30. Since, flight control surface 10 is connected to arm 20, flight control surface 10 cannot move in first direction D1 when arm 20 is in contact with stop surface 50. Therefore, the deployed configuration 16 of the flight control surface 10 is defined by contact between stop surface 50 and arm 20.

Examples of stop surface 50 vary in shape, orientation, and configuration. The location and angle of stop surface 50 dictates when arm 20 will contact the stop surface and therefore define deployed configuration 16. In the example of FIG. 2, link 30 has a link longitudinal axis L1, and stop surface 50 is angled relative to the link longitudinal axis L1. In further examples, the stop surface 50 is oriented parallel to arm longitudinal axis L2 when stop surface 50 and contact surface 22 are in contact.

Examples of stop surface 50 are arranged between first end region pivot axis 36 and second end region pivot axis 37, as shown in FIG. 2. In other words, examples of stop surface 50 are arranged between arm 20 and support 60. In further examples, stop surface 50 is arranged on a side of link 30 of the second direction D2 or stowed configuration 18.

Further examples of aircraft apparatus 100 comprise further surfaces in contact in addition to the contact between stop surface 50 and contact surface 22. In other words, the arm 20 and link 30 have two points of contact. For example, FIG. 6 depicts stop surface 50 in contact with contact surface 22 and link surface 38 in contact with second contact surface 70. FIG. 2 depicts the multiple contact surfaces when not in contact. FIG. 6 depicts stop surface 50 engaging contact surface 22 and link surface 38 engaging second contact surface 70.

Examples of stop surface 50, contact surface 22, link surface 38, and second contact surface 70 vary in orientation and configuration. In the example of FIG. 2, second contact surface 70 and link surface 38 are oriented at different angles relative to link longitudinal axis L1. Similarly, contact surface 22 and second contact surface 70 are oriented at different angles relative to arm longitudinal axis L2. Furthermore, at the deployed configuration 16, the angle of stop surface 50 relative to link longitudinal axis L1 may be the same as the angle of contact surface 22 relative to link longitudinal axis L1 and, simultaneously, the angle of link surface 38 relative to link longitudinal axis L1 may be the same as the angle of second contact surface 70 relative to link longitudinal axis L1.

In some examples, each of arm 20 and link 30 comprise two distinct contact surfaces. Arm 20 comprises contact surface 22 (which may be referred to as a first contact surface 22') and a second contact surface 70. Similarly, link 30 comprises stop surface 50 and a link surface 38. In addition to the contact of stop surface 50 and contact surface 22 to limit movement of arm 20 (and therefore flight control surface 10), second contact surface 70 engages link surface 38 in the deployed configuration 16. Multiple contact surfaces between arm 20 and link 30 may distribute a load of the contact over a larger total contact surface area, which may help to prevent wear on the actuation assembly. Multiple contact surfaces may also prevent slippage or unwanted movement of arm 20 and/or flight control surface 10 in the deployed configuration 16.

In one example, contact surface 22 is arranged on a side of arm 20 and second contact surface 70 is arranged on a protrusion 72 from contact surface 22. In further examples, contact surface 22 and second contact surface 70 are arranged on a side of arm 20 that faces link 30. Some examples of second contact surface 70 are arranged on protrusion 72 which extends in the direction of link 30. Examples of second contact surface 70 arranged on protrusion 72 can be seen in FIGS. 2 and 4-7. In further examples, contact surface 22 is arranged parallel to an arm longitudinal axis L2 and second contact surface 70 is arranged at an angle relative to arm longitudinal axis L2. In other examples, a notch may be formed in arm 20 and the notch comprises contact surface 22 and second contact surface 70.

Some examples of contact surface 22 and second contact surface 70 are arranged on a side of link 30 opposite flight control surface 10, as depicted in FIG. 2. In other words, flight control surface 10 is arranged on a first side of second end region pivot axis 37 and contact surface 22 and second contact surface 70 are arranged on a second side of second end region pivot axis 37 opposite the first side.

Examples of multiple contact surfaces may vary in shape, orientation, and configuration. In one example depicted in FIG. 2, link surface 38 and stop surface 50 are arranged at different angles relative to link longitudinal axis L1. In a further example, link surface 38 is arranged on a link side 35. In still further examples, link surface 38 is oriented parallel to link longitudinal axis L1. An example of an orientation of link surface 38 and stop surface 50 relative to link longitudinal axis L1 is depicted in FIG. 2.

Examples of aircraft apparatus 100 further comprise second direction stop surface 58 and third contact surface 23. Examples of second direction stop surface 58 are arranged on link 30. For example, the second direction stop surface 58 of FIG. 2 is arranged on a same side of link longitudinal axis L1 as flight control surface 10, the first direction D1, and deployed configuration 16. Further examples of second direction stop surface 58 are arranged on an opposite side of link longitudinal axis L1 from stop surface 50. The second direction stop surface 58 of FIG. 2 is angled relative to link longitudinal axis L1.

Examples of second direction stop surface 58 are arranged between first end region pivot axis 36 and second end region pivot axis 37, as shown in FIG. 2. In other words, examples of second direction stop surface 58 are arranged between arm 20 and support 60.

Similarly to stop surface 50, examples of second direction stop surface 58 are arranged in the space between two limbs 39. In other examples, link 30 comprises one limb 39, and second direction stop surface 58 and arm 20 are arranged on a side of the one limb 39.

Examples of arm 20 comprise third contact surface 23 which contacts second direction stop surface 58. Contact of third contact surface 23 and second direction stop surface 58 prevents further movement of the arm 20 in second direction D2. Therefore, in some examples, contact of third contact surface 23 and second direction stop surface 58 define a stowed configuration 18. In other examples, a stop is arranged on the structure of wing 92 of an aircraft 90 to stop movement in the second direction D2 and define the stowed configuration 18.

Examples of third contact surface 23 vary in configuration and orientation. Examples of third contact surface 23 are oriented parallel to arm longitudinal axis L2. Further examples of third contact surface 23 are arranged at an angle relative to arm longitudinal axis L2 or are positioned on a portion of arm 20 arranged at an angle relative to arm longitudinal axis L2. For example, the arm 20 depicted in FIG. 4 comprises third contact surface 23 arranged on connection portion 28, which extends at an angle relative to arm longitudinal axis L2. Examples of third contact surface 23 are arranged on a side of link 30 of the flight control surface 10. In other words, third contact surface 23 is arranged on a side of link 30 opposite the second direction D2 and stowed configuration 18.

Contact surfaces also may comprise wear surfaces to prevent wear to arm 20 and/or link 30. In one example, a wear surface 52 is attached to stop surface 50. In other examples, wear surfaces may be attached to stop surface 50, contact surface 22, second contact surface 70, and/or link surface 38. Some examples of wear surface 52 are composed of a different material than link 30 and/or arm 20. Further examples of wear surface 52 are formed as a separate component from link 30 and/or arm 20 and are attached to link 30 and/or arm 20.

Figure 7:
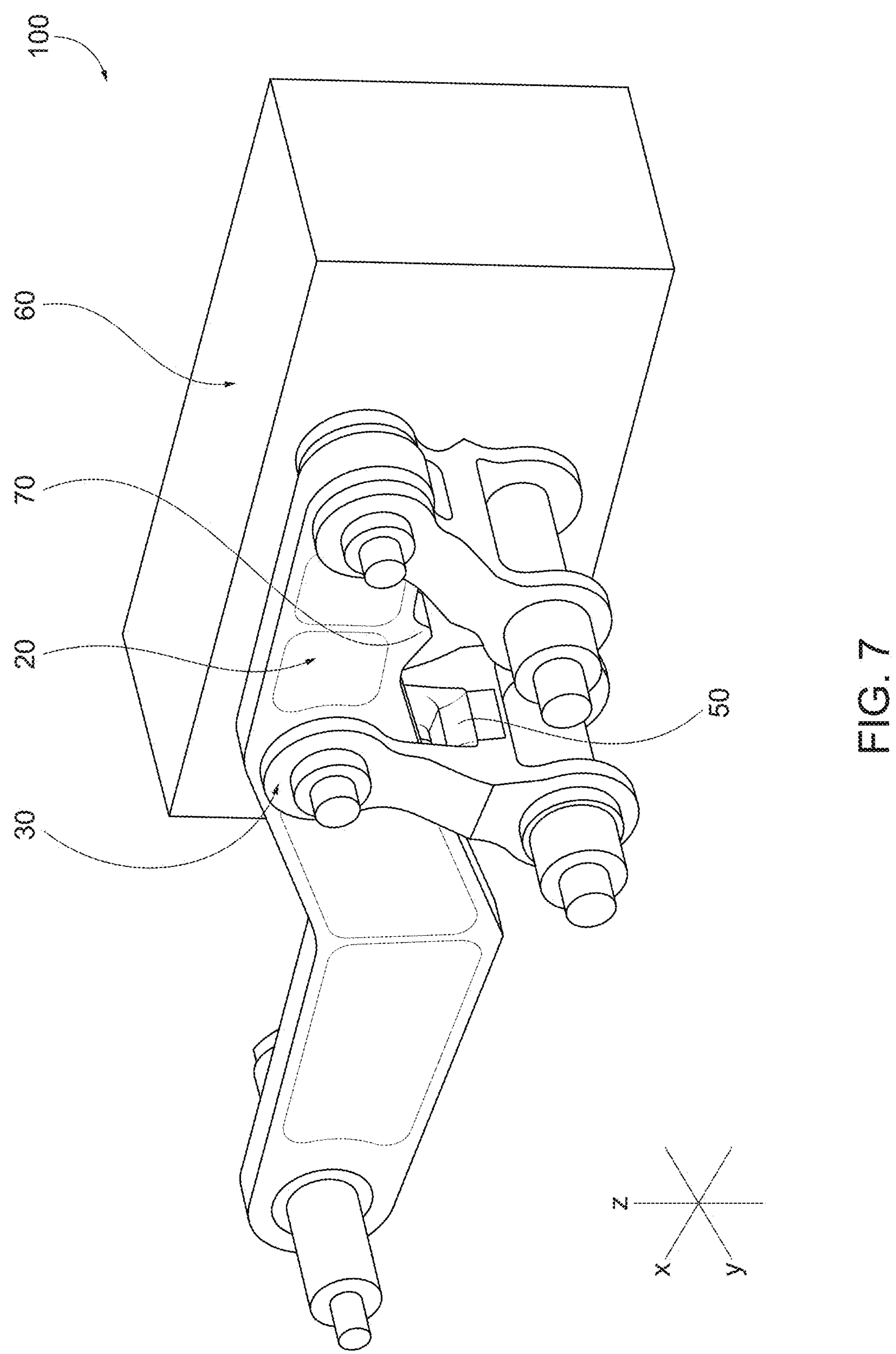
FIG. 7 is a perspective view of an arm, a link, and a support.
Figure 8:
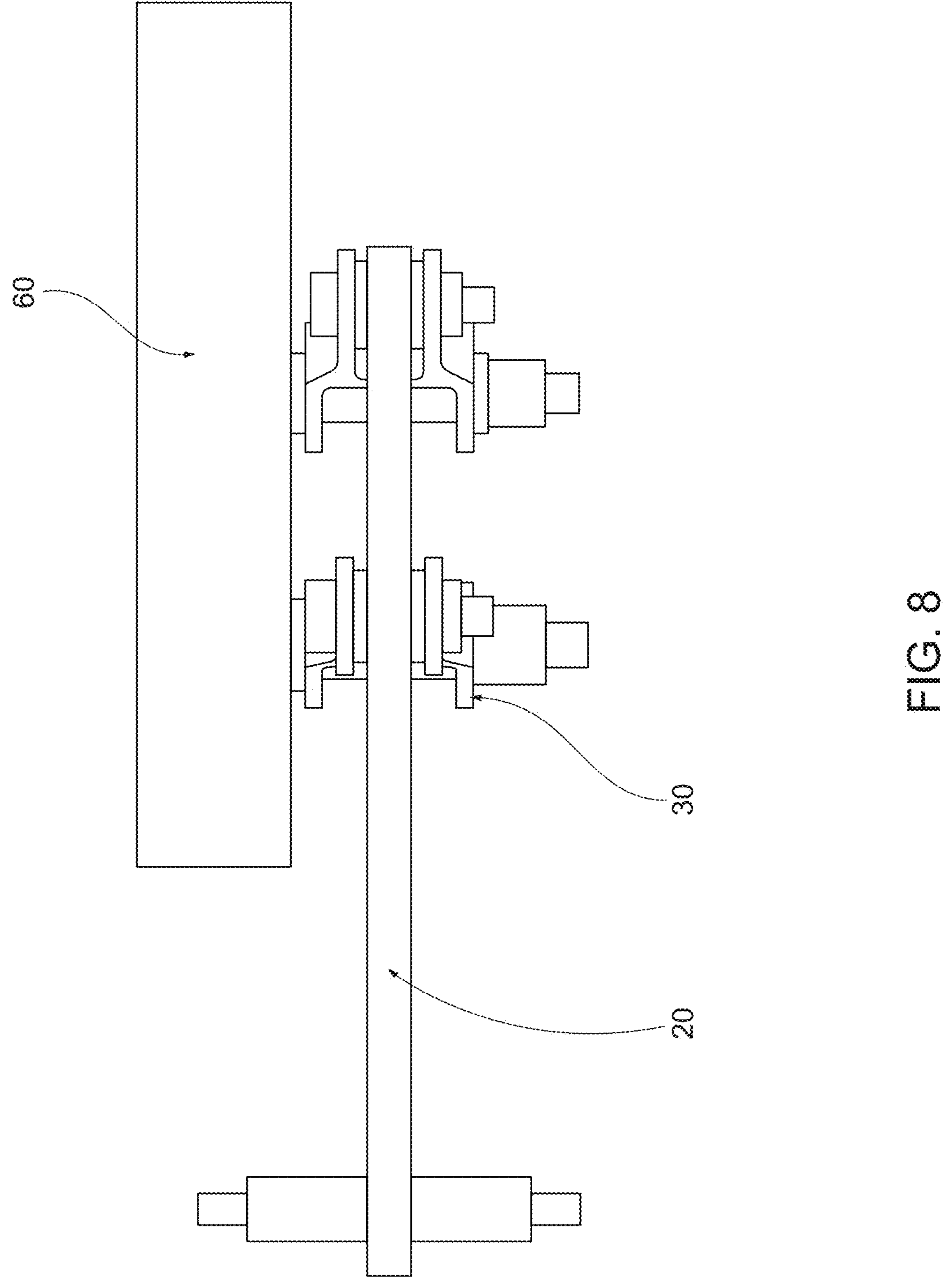
FIG. 8 is a top perspective view of an arm, a link, and a support.

Further examples of aircraft apparatus 100 are depicted in FIGS. 7 and 8. FIG. 7 depicts an exemplary perspective view of arm 20, link 30, stop surface 50, second contact surface 70, and support 60. The perspective view depicts link 30 connected to a rotational axis at support 60 and arm 20 pivotably connected to link 30. The perspective view of FIG. 7 also provides a three-dimensional representation of stop surface 50 and second contact surface 70.

FIG. 8 shows a top down view of arm 20, link 30, and support 60 where connections between link 30 and arm 20, between link 30 and support 60, and the location of connection between arm 20 and flight control surface 10 can be seen.

Figure 9:
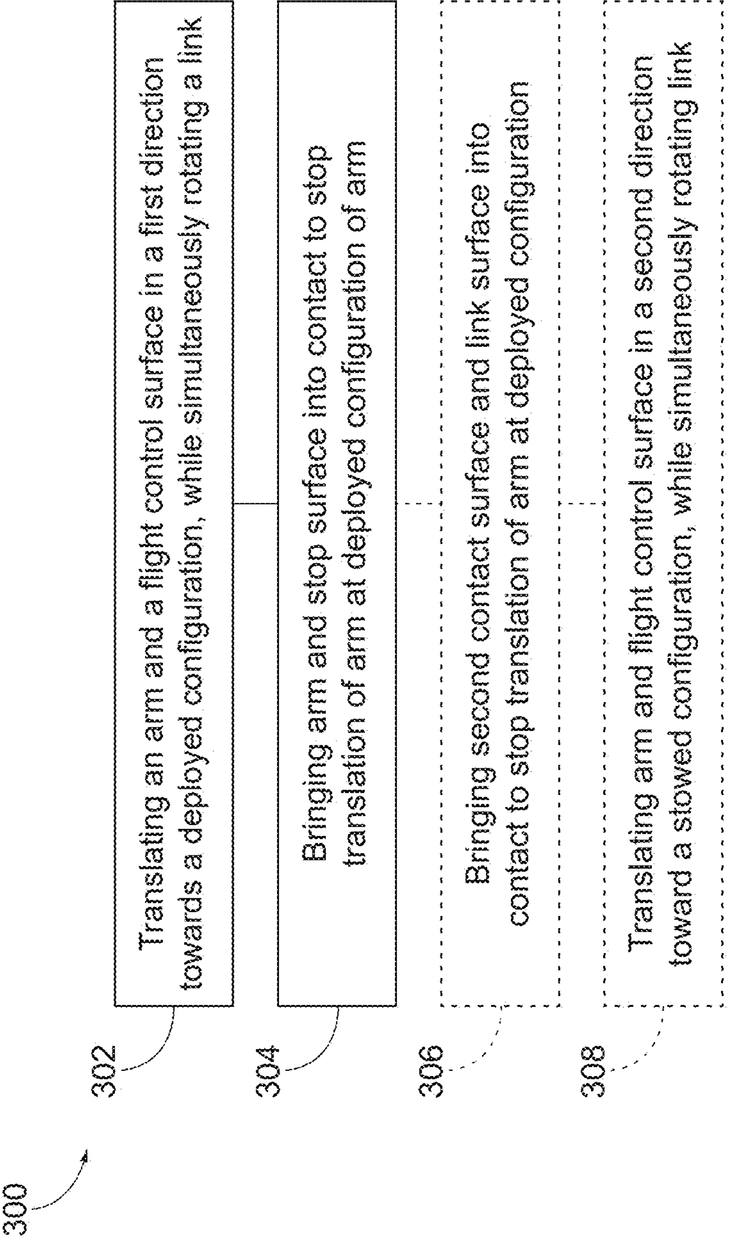
FIG. 9 is a flowchart schematically representing methods for operating an aircraft apparatus.

FIG. 9 schematically provides a flowchart that represents illustrative, non-exclusive examples of methods of operating aircraft apparatus 100 according to the present disclosure. In FIG. 9, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein.

An example of methods 300 of operating aircraft apparatus 100 comprises translating 302 an arm 20 and a flight control surface 10 in a first direction D1 towards a deployed configuration 16 while simultaneously rotating a link 30. The method 300 further comprises contacting 304 the arm 20 and a stop surface 50 of link 30 to stop translation of arm 20 at deployed configuration 16 of arm 20.

In one example of method 300, arm 20 comprises a contact surface 22, and stop surface 50 contacts contact surface 22 at deployed configuration 16. In further examples of method 300, stop surface 50 is arranged parallel to contact surface 22 at deployed configuration 16. Contact of stop surface 50 and arm 20 limits translation of arm 20 which is connected to flight control surface 10 and thus defines deployed configuration 16.

In further examples of method 300, link 30 comprises a link surface 38 and arm 20 comprises a contact surface 22 and a second contact surface 70. In such examples, method 300 further comprises contacting 306 second contact surface 70 and link surface 38 to stop the translation of arm 20 at deployed configuration 16. In further examples, second contact surface 70 is oriented parallel to link surface 38 in deployed configuration 16. Multiple contact surfaces may distribute load among a larger surface area and decrease wear and slip between components.

Further examples of method 300 comprise translating 308 arm 20 and flight control surface 10 in a second direction D2 toward a stowed configuration 18 while simultaneously rotating the link 30. Thus, the flight control surface 10 is moveable between a deployed configuration 16 and stowed configuration 18. In some examples of aircraft 90, moving the flight control surface from deployed configuration 16 to stowed configuration 18 changes the aerodynamics of a wing 92 of aircraft 90.

Illustrative, non-exclusive examples of inventive subject matter according to the present disclosure are described in the following enumerated paragraphs:

A. An aircraft apparatus (100), comprising:

a flight control surface (10);

an actuation assembly (94) operatively coupled to the flight control surface (10) and configured to operatively transition the flight control surface (10) between at least a stowed configuration (18) and a deployed configuration (16);

a link (30) comprising a first end region (32) and a second end region (34) opposite the first end region (32), wherein the link (30) has a first end region pivot axis (36) arranged at a support (60) and a second end region pivot axis (37), and wherein the link (30) comprises a stop surface (50); and an arm (20) operatively connected to the flight control surface (10) and pivotally coupled to the second end region (34) of the link (30) about the second end region pivot axis (37), wherein the arm (20) comprises a contact surface (22) that is arranged to engage the stop surface (50) to limit pivotal movement of the arm (20) relative to the link (30) and thus define the deployed configuration (16) of the flight control surface (10).

A1. The aircraft apparatus (100) of paragraph A, further comprising a wing (92), wherein the flight control surface (10) is arranged on the wing (92).

A2. The aircraft apparatus (100) of any of paragraphs A-A1, wherein the actuation assembly (94) is configured to apply force to the flight control surface (10); and the link (30) and the arm (20) are configured to guide movement of the flight control surface (10).

A3. The aircraft apparatus (100) of any of paragraphs A-A2, wherein the link (30) is a first side link (30'), wherein the arm (20) is a first arm (20'), wherein the flight control surface (10) comprises a first side (12) and a second side (14) opposite the first side (12), and wherein the first arm (20') and the first side link (30') are operatively coupled to the first side (12) of the flight control surface (10); and wherein the aircraft apparatus (100) further comprises a second arm (20") and a second side link (30"), and wherein the second arm (20") is operatively coupled to the second side (14) of the flight control surface (10).

A3.1. The aircraft apparatus (100) of paragraph A3 when depending from paragraph A2, wherein the actuation assembly (94) is arranged between the first arm (20') and the second arm (20").

A4. The aircraft apparatus (100) of any of paragraphs A-A3.1, wherein the link (30) is a first link (30), and the aircraft apparatus (100) comprises a second link (40), wherein the arm (20) comprises a first arm portion (24), a second arm portion (26) and a connecting portion (28), wherein the first arm portion (24) extends between the second end region (34) of the first link (30) and the second link (40), the second arm portion (26) extends away from the first link (30) toward the flight control surface (10), and the connecting portion (28) connects the first arm portion (24) and the second arm portion (26).

A4.1. The aircraft apparatus (100) of paragraph A4, wherein the aircraft apparatus (100) has a height (H), and wherein the connecting portion (28) of the arm (20) extends in a direction of the first end region pivot axis (36) such that the height (H) of the aircraft apparatus (100) is reduced.

A5. The aircraft apparatus (100) of any of paragraphs A-A4.1, wherein the link (30) comprises two limbs (39), and wherein the arm (20) and the stop surface (50) are arranged between the two limbs (39).

A6. The aircraft apparatus (100) of any of paragraphs A-A5, wherein the arm (20) rotates relative to the link (30) as the arm (20) translates in a first direction (D1) towards the deployed configuration (16).

A7. The aircraft apparatus (100) of any of paragraphs A-A6, further comprising a/the second link (40), wherein the second link (40) comprises a first end region (42) connected to the arm (20) and a second end region (44) pivotably coupled to a second end region pivot axis (46) arranged at a support (60).

A8. The aircraft apparatus (100) of any of paragraphs A-A7.1, wherein the link (30) has a link longitudinal axis (L1), and wherein the stop surface (50) is angled relative to the link longitudinal axis (L1).

A9. The aircraft apparatus (100) of any of paragraphs A-A8, wherein the contact surface (22) is a first contact surface (22), wherein the link (30) comprises a link surface (38), wherein the arm (20) comprises a second contact surface (70), wherein the second contact surface (70) engages the link surface (38) in the deployed configuration (16).

A9.1. The aircraft apparatus (100) of paragraph A9, wherein the link surface (38) and the stop surface (50) are arranged at different angles relative to a/the link longitudinal axis (L1).

A9.2. The aircraft apparatus (100) of paragraph A9, wherein the link (30) comprises a link side (35), and wherein the link surface (38) is arranged on the link side (35).

A9.3. The aircraft apparatus (100) of paragraph A9, wherein the link surface (38) is oriented parallel to a/the link longitudinal axis (L1).

A10. The aircraft apparatus (100) of any of paragraphs A-A9.3, further comprising a wear surface (52) attached to the stop surface (50).

A11. The aircraft apparatus (100) of any of paragraphs A-A10, wherein the arm (20) comprises and a third contact surface (23) and the link (30) comprises a second direction stop surface (58), wherein the second direction stop surface (58) is arranged to engage the third contact surface (23) to limit pivotal movement of the arm (20) in a second direction (D2) relative to the link (30) and thus define a stowed configuration (18) of the flight control surface (10).

A11. Use of the aircraft apparatus (100) of any of paragraphs A-A10, to control position of a flight control surface (10).

B. A method (300) of operating an aircraft apparatus (100), the method comprising:

translating (302) an arm (20) and a flight control surface (10) in a first direction (D1) towards a deployed configuration (16) while simultaneously rotating a link (30), wherein the link (30) comprises a stop surface (50); and bringing (304) the arm (20) and the stop surface (50) into contact to stop translation of the arm (20) at the deployed configuration (16) of the flight control surface (10).

B1. The method (300) of paragraph B, wherein the arm (20) comprises a contact surface (22), wherein the stop surface (50) contacts the contact surface (22) at the deployed configuration (16), and wherein the stop surface (50) is arranged parallel to the contact surface (22) at the deployed configuration (16).

B2. The method (300) of any of paragraphs B-B1, wherein a/the contact surface (22) is a first contact surface (22), wherein the arm (20) comprises a second contact surface (70), wherein the link (30) comprises a link surface (38), and the method (300) further comprises bringing (306) the second contact surface (70) and the link surface (38) into contact to stop the translation of the arm (20) at the deployed configuration (16).

B3. The method (300) of paragraph B2, wherein the second contact surface (70) is oriented parallel to the link surface (38) in the deployed configuration (16).

B4. The method (300) of any of paragraphs B-B3, further comprising translating (308) the arm (20) and the flight control surface (10) in a second direction (D2) toward a stowed configuration (18) while simultaneously rotating the link (30).

C. An aircraft (90) comprising:

a wing (92):

a flight control surface (10) arranged on the wing (92);

an actuation assembly (94) operatively coupled to the flight control surface (10) and configured to operatively transition the flight control surface (10) between at least a stowed configuration (18) and a deployed configuration (16);

a link (30) comprising a first end region (32) and a second end region (34) opposite the first end region (32), wherein the link (30) has a first end region pivot axis (36) arranged at a support (60) and a second end region pivot axis (37), and wherein the link (30) comprises a stop surface (50); and an arm (20) operatively connected to the flight control surface (10) and pivotally coupled to the second end region (34) of the link (30) about the second end region pivot axis (37), wherein the arm (20) comprises a contact surface (22) that is arranged to engage the stop surface (50) to limit pivotal movement of the arm (20) relative to the link (30) and thus define the deployed configuration (16) of the flight control surface (10).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft apparatus, comprising:

a flight control surface;

an actuation assembly operatively coupled to the flight control surface and configured to operatively transition the flight control surface between at least a stowed configuration and a deployed configuration;

a link comprising a first end region and a second end region opposite the first end region, wherein the link has a first end region pivot axis arranged at the first end region and operably couple to a support, and a second end region pivot axis arranged at the second end region, wherein the link is configured to rotate about the first end region pivot axis, and wherein the link comprises a stop surface; and an arm operatively connected to the flight control surface and pivotally coupled to the second end region of the link about the second end region pivot axis, wherein the arm is configured to translate towards the deployed configuration as the link rotates about the first end region pivot axis, wherein the arm comprises a contact surface that is arranged to engage the stop surface to limit pivotal movement of the arm relative to the link and thus define the deployed configuration of the flight control surface.

2. The aircraft apparatus of claim 1, wherein the link comprises two limbs, and wherein the arm and the stop surface are arranged between the two limbs.

3. The aircraft apparatus of claim 1, wherein the arm rotates relative to the link as the arm translates in a first direction toward the deployed configuration.

4. The aircraft apparatus of claim 1, wherein the link has a link longitudinal axis, and wherein the stop surface is angled relative to the link longitudinal axis.

5. The aircraft apparatus of claim 1, wherein the contact surface is a first contact surface, wherein the link comprises a link surface, wherein the arm comprises a second contact surface, wherein the second contact surface engages the link surface in the deployed configuration.

6. The aircraft apparatus of claim 5, wherein the link has a link longitudinal axis, and wherein the link surface and the stop surface are arranged at different angles relative to the link longitudinal axis.

7. The aircraft apparatus of claim 5, wherein the link comprises a link side, and wherein the link surface is arranged on the link side.

8. The aircraft apparatus of claim 5, wherein the link has a link longitudinal axis, and wherein the link surface is oriented parallel to the link longitudinal axis.

9. The aircraft apparatus of claim 1, further comprising a wear surface attached to the stop surface.

10. An aircraft comprising:

a wing:

a flight control surface arranged on the wing;

an actuation assembly operatively coupled to the flight control surface and configured to operatively transition the flight control surface between at least a stowed configuration and a deployed configuration;

a link comprising a first end region and a second end region opposite the first end region, wherein the link has a first end region pivot axis arranged at the first end region and operably couple to a support, and a second end region pivot axis arranged at the second end region, wherein the link is configured to rotate about the first end region pivot axis, and wherein the link comprises a stop surface; and an arm operatively connected to the flight control surface and pivotally coupled to the second end region of the link about the second end region pivot axis, wherein the arm is configured to translate towards the deployed configuration as the link rotates about the first end region pivot axis, wherein the arm comprises a contact surface that is arranged to engage the stop surface to limit pivotal movement of the arm relative to the link and thus define the deployed configuration of the flight control surface.

11. The aircraft of claim 10, wherein the actuation assembly is configured to apply force to the flight control surface; and the link and the arm are configured to guide movement of the flight control surface.

12. The aircraft of claim 10, wherein the link is a first side link, wherein the arm is a first arm, wherein the flight control surface comprises a first side and a second side opposite the first side, and wherein the first arm is operatively coupled to the first side of the flight control surface; and wherein the aircraft further comprises: a second arm and a second side link, wherein the second arm is operatively coupled to the second side of the flight control surface, and wherein the actuation assembly is arranged between the first arm and the second arm.

13. The aircraft of claim 10, wherein the arm comprises a third contact surface and the link comprises a second direction stop surface, wherein the second direction stop surface is arranged to engage the third contact surface to limit pivotal movement of the arm in a second direction relative to the link and thus define the stowed configuration of the flight control surface.

14. The aircraft of claim 10, wherein the link comprises a link surface and the link has a link longitudinal axis, wherein the arm comprises a first contact surface and a second contact surface and the arm has an arm longitudinal axis, wherein the second contact surface engages the link surface in the deployed configuration, and wherein the link surface and the stop surface are arranged at different angles relative to the link longitudinal axis.

15. The aircraft of claim 10, wherein the link has a link longitudinal axis and the link comprises a link surface and a link side, and wherein the link surface is arranged on the link side, and wherein the link surface is oriented parallel to the link longitudinal axis.

16. A method of operating an aircraft apparatus, the method comprising:

translating an arm and a flight control surface in a first direction towards a deployed configuration while simultaneously rotating a link, wherein the link comprises a stop surface, wherein the link comprises a first end region and a second end region opposite the first end region, and wherein the link has a first end region pivot axis arranged at a support and a second end region pivot axis, wherein the arm comprises a contact surface, wherein the arm is pivotally coupled to the second end region of the link about the second end region pivot axis, and wherein the stop surface contacts the contact surface at the deployed configuration; and bringing the arm and the stop surface into contact to stop translation of the arm at the deployed configuration of the flight control surface.

17. The method of claim 16, wherein the stop surface is arranged parallel to the contact surface at the deployed configuration.

18. The method of claim 16, wherein the arm comprises a first contact surface and a second contact surface, wherein the link comprises a link surface, and the method further comprises bringing the second contact surface and the link surface into contact to stop translation of the arm at the deployed configuration.

19. The method of claim 18, wherein the second contact surface is oriented parallel to the link surface in the deployed configuration.

20. The method of claim 16, further comprising translating the arm and the flight control surface in a second direction toward a stowed configuration, while simultaneously rotating the link.

* * * * *